July 30, 1935.  L. W. HANCE  2,009,958

PISTON PACKING

Filed July 24, 1933  3 Sheets-Sheet 1

INVENTOR
Lawrence W. Hance
BY
ATTORNEY

July 30, 1935.  L. W. HANCE  2,009,958
PISTON PACKING
Filed July 24, 1933    3 Sheets-Sheet 2
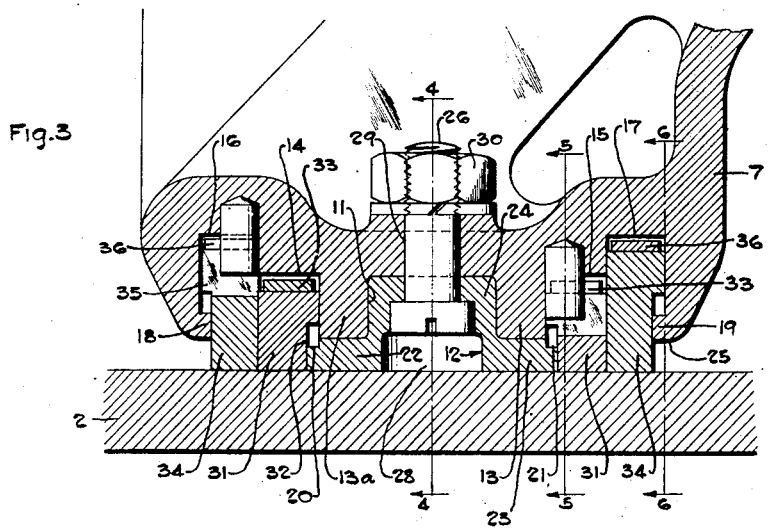
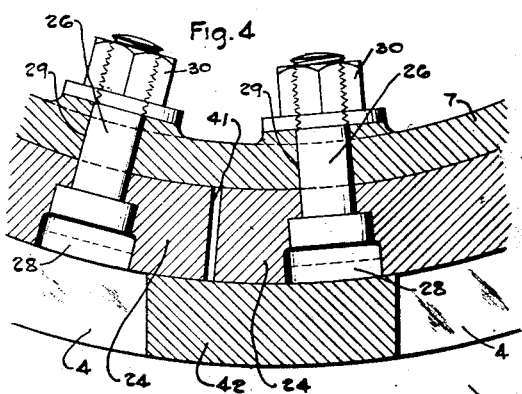
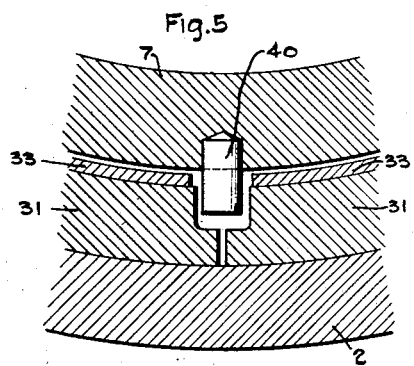
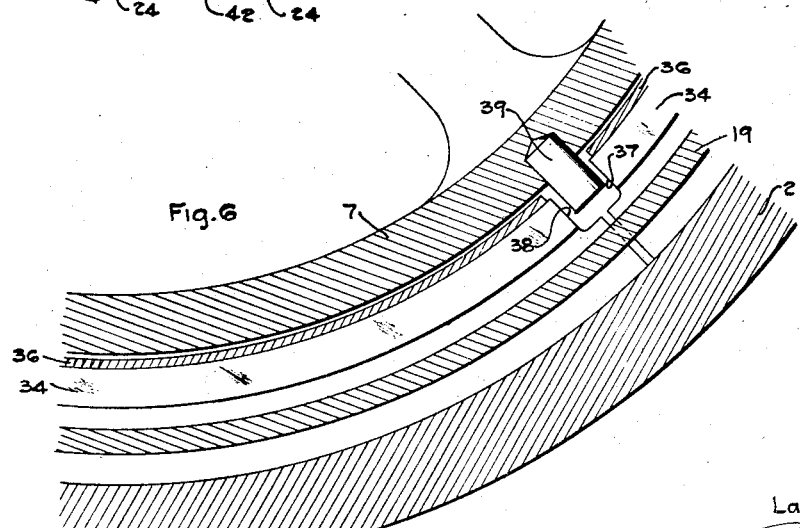
INVENTOR
Lawrence W. Hance
BY
ATTORNEY July 30, 1935.  L. W. HANCE  2,009,958
PISTON PACKING
Filed July 24, 1933  3 Sheets-Sheet 3
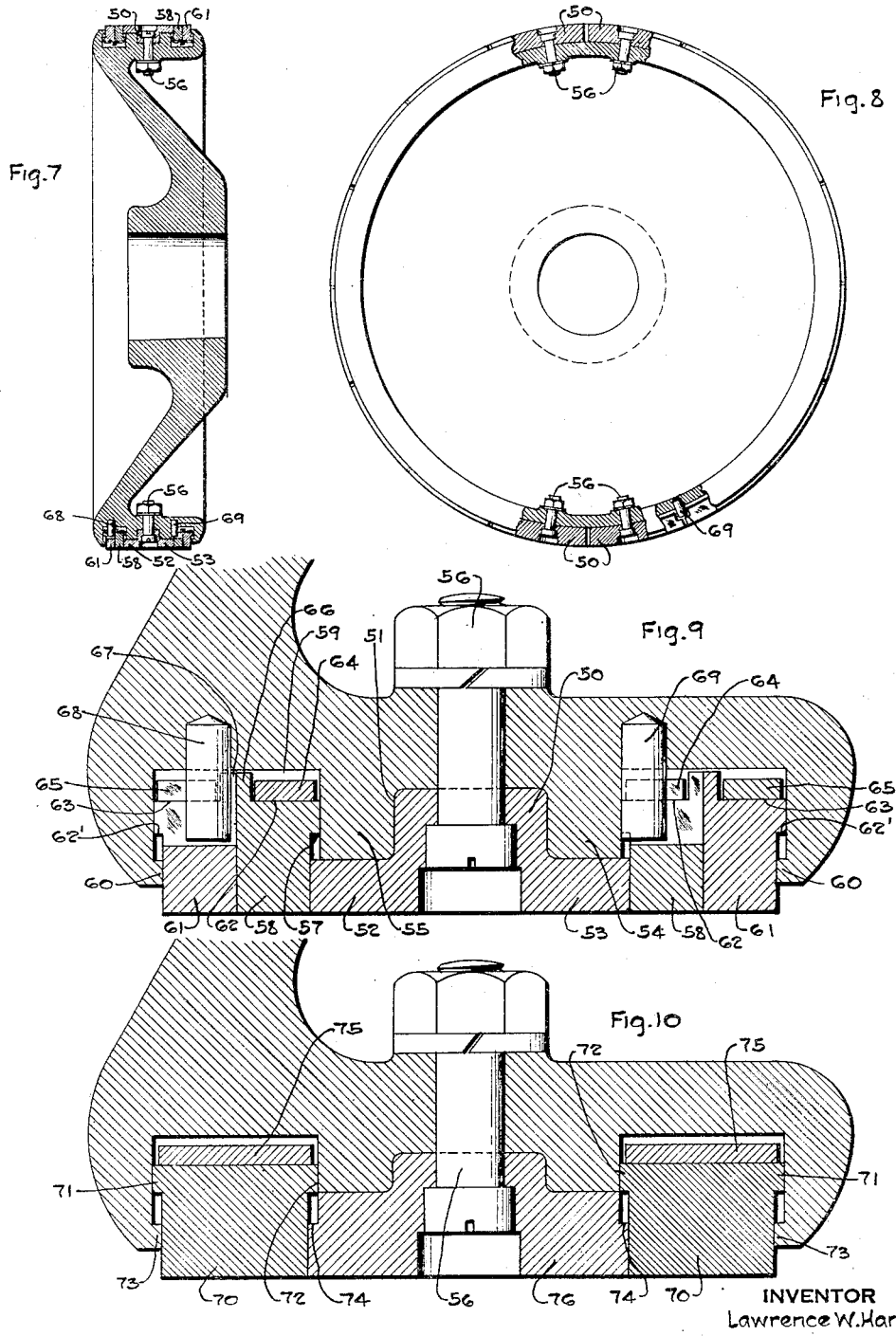
INVENTOR
Lawrence W. Hance
BY
ATTORNEY Patented July 30, 1935

2,009,958

UNITED STATES PATENT OFFICE 2,009,958

PISTON PACKING

Lawrence W. Hance, Philadelphia, Pa.

Application July 24, 1933, Serial No. 681,969

11 Claims. (Cl. 309—4)

This invention relates generally to an improved combination of bull ring and sealing rings and more particularly to an improved arrangement in such a combination whereby interlocking segmental rings are adapted to be efficiently and economically employed.

A great many attempts have heretofore been made to provide suitable sealing means for pistons and piston valves or other similar mechanisms. While single piece piston rings have been used to a very large extent, yet it is well-known that such rings have distinct limitations in maintaining a perfect seal whereas prior attempts to provide sectional or segmental rings in order to maintain a substantially perfect seal have resulted in the ring sections being fragile and thus readily breakable. To overcome these difficulties, certain attempts have been made to provide a bull ring in combination with piston rings, but these arrangements have been expensive and difficult to replace after once being placed in use, thereby resulting in high maintenance cost.

It is one object of my invention to obtain the advantages of sectional metallic packing rings without the difficulties of the prior arrangements and a more specific object of the invention is to accomplish this result by providing a bull ring for supporting the weight of the piston in cooperation with improved and simplified interlocking sectional packing rings, the bull ring and packing rings being so arranged and related with respect to the piston body so as to be positively supported and guided thereby independently of each other and yet be arranged for functional cooperation to hold the packing or sealing rings in position with minimum possibility of leakage.

A further object is to provide an improved arrangement between the bull ring and packing rings such as above set forth and to permit such arrangement to be effectively used in either an engine piston or piston valve.

Other objects and advantages will be more apparent to those skilled in the art from the following description of the accompanying drawings in which:

Fig. 3 is an enlarged fragmentary section through one side of the end casting of the piston valve shown in Fig. 1;

Figs. 4 to 6 are respectively transverse sections taken on the lines 4—4, 5—5 and 6—6 of Fig. 3;

Fig. 7 is a sectional view through an engine piston showing a modified arrangement of my improved combination applied to an engine piston;

Fig. 8 is an end view of the piston shown in Fig. 7 with parts broken away to show details of construction;

Fig. 9 is an enlarged fragmentary section of one side of the piston shown in Fig. 7;

Fig. 10 is a further modification of my combination.

Figure 1:
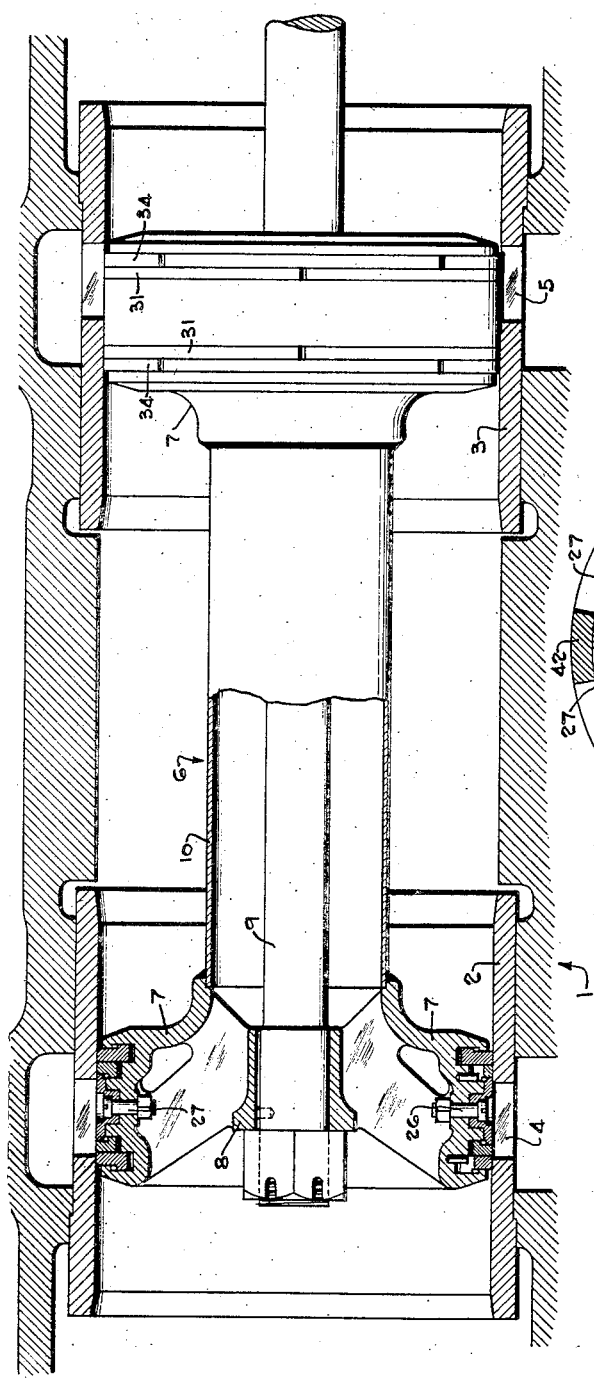
Fig. 1 is a longitudinal sectional view of a piston valve and steam chest with one end of the valve broken away to show details of construction of one form of my improved bull ring and sealing ring arrangement as applied to a piston valve.
Figure 2:
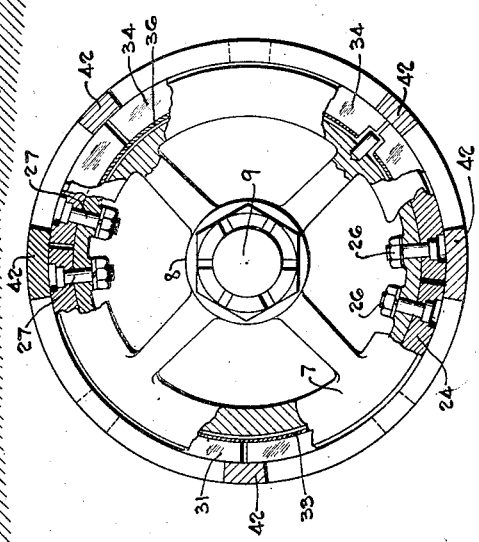
Fig. 2 is an end view of the body and casting of the valve shown in Fig. 1, parts being broken away to show details of construction.

In the illustrated embodiments of the invention shown herein for the purpose of disclosing certain specific forms among others that the invention might take, I have provided a valve chest 1 having piston valve sleeves 2 and 3. These sleeves and chest are provided with valve ports 4 and 5 leading to opposite ends of a double acting engine cylinder and are controlled by a piston valve generally indicated at 6. The two piston ends of this valve are identical and hence only one end and its rings will be described in detail.

Any suitable form of piston valve construction may be used but preferably is of the type employing a solid end casting 7 having ribs to support a central boss 8 in which is secured a valve actuating rod 9. The end casting 7 may be integrally connected to the corresponding end casting at the other end of the valve or a relatively thin steel pipe 10 may be welded or otherwise suitably secured to the end casting 7.

As shown more fully in Figs. 3 to 6, the end casting 7 is provided with a ring groove of varying depths to form intermediate flanges, or more specifically it comprises an annular recess 11 for centering a bull ring generally indicated at 12. This recess is bounded by annular flanges 13 and 13a while recesses 14 and 15 are provided adjacent the outside of said flanges. These outside recesses in turn communicate with further recesses 16 and 17 offset inwardly at an appreciable distance from the bottom of recesses 14 and 15, although the provision of circular interlocking flanges 18 and 19 formed integrally with the end casting 7 causes the actual radial depth of recesses 16 and 17 to be not materially greater than the complete depth of recesses 14 and 15. The full depth of recesses 14 and 15 is created preferably by the provision of slight recesses 20 and 21 at the inside corners of lips 22 and 23 of bull ring 12.

Bull ring 12 is formed in a plurality of segments, preferably two, each having an inwardly projecting annular flange 24 disposed within recess 11 while the lips 22 and 23 rest upon the periphery of flanges 13 and 13a. Due to the periphery of the bull ring extending an appreciable distance beyond the periphery 25 of the end casting 7, it is seen that this bull ring will support the weight of the piston and that there will be minimum danger of breaking lips 22 and 23 due to resting on flanges 13 and 13a. The opposite ends of each bull ring segment are secured to end casting 7 by the provision of bolts 26 and 27. These bolts and their heads are received in suitable openings and recesses generally indicated at 28 in the bull ring and at 29 in the end casting while nuts 30 permit the bolts to be tightly fastened from inside of end or piston element 7.

Disposed within recess 14 are segmental piston rings 31 provided with an annular recess 32 to receive the portion of lip 22 which overhangs the flange 13a thereby providing a positive and yet simple means in combination with the bull ring for preventing dislodgment of ring 31 either by steam pressure or by the action of a circular expanding spring 33 preferably of flat material.

Disposed adjacent to ring 31 and in slidable contact therewith and supported entirely by the piston head 7 independently of ring 31 is a second series of segmental or sectional sealing rings 34. These rings have an offset portion 35 to provide an interlocking shoulder with flange 18. It will be noted that the inner portion of said rings 34 is adapted to be guided by the opposite walls of recess 16 independently of ring 31 although a necessary close sliding fit is maintained between the two sets of rings 31 and 34 to maintain any desired degree of sealing between these rings. Also the series of segments 34 may be moved outwardly either by fluid pressure that may leak behind the same or by the action of a flat circular spring 36.

To cause the adjacent ends 37 and 38, Fig. 6, of the one series of rings to be maintained in staggered relation to the adjacent ends of the inner series of rings, I have provided dowel pins 39 and 40, Figs. 5 and 6. The sealing rings in the other set of recesses are identical to those described for the other side and hence further description of this arrangement is not necessary.

It will be noted that in Fig. 4 the adjacent ends 41 of the bull ring segments are disposed over the bridge or bridges 42 in the valve ports 4 thus minimizing leakage and preventing ends of the rings from catching in the ports.

In operation, the bull ring 12 will entirely support the weight of the piston while the two sets of sealing rings on each side thereof will function to seal the valve as it passes over valve ports 4. One function of the present arrangement as applied to valves is that when segments 31 have moved so as to be entirely exposed to the fluid pressure in port 3, these segments will then be collapsed by such pressure and their sealing action broken. However, the outer series of sealing rings 34 will still maintain positive sealing engagement with the wall of the piston valve, thereby minimizing the possibility of leakage. While this general function has heretofore been performed, yet in my improved arrangement the outer segments are positively guided on each side by the piston head even though the inner series of segments 31 have collapsed. Hence during collapsing of the inner series there is less tendency for such collapsing to frictionally engage the outer series of rings with sufficient force to tend to move the same inwardly from their sealing position.

In Figs. 7 to 9 I have embodied in an engine piston certain principles of the foregoing disclosure such for instance as the provision of sectional bull rings 50 having an annular flange seated within an annular recess 51 while lips 52 and 53 rest directly upon flanges 54 and 55 disposed on each side of recess 51. Holding bolts 56 pass through the opposite ends of each bull ring segment to hold the same tightly in position. The lips 52 and 53 overhang said flanges to provide an interlocking shoulder adapted for cooperation with a shoulder 57 formed on a series of segmental sealing rings 58. This series of segments are disposed within a recess 59 whose opposite wall has an interlocking flange 60. A second series of segmental sealing rings 61 also have a shoulder 62' for cooperation with the interlocking flange or shoulder 60. It will be noted that the series of rings 58 and 61 are of the same radial depth and substantially identical except that the interlocking flanges extend axially in opposite directions while plain surface engagement is provided between the two sets of rings. Also each set of rings is provided with annular recesses 62 and 63 to receive flat circular springs 64 and 65. As a result of this construction it is seen that a small annular rib is provided on the inner periphery of each segment so as to properly guide the springs 64 and 65 and thus cause the action of each spring to be confined definitely to its own set of segments. These ribs 66 and 67 serve the further function of insuring proper spacing for the springs 64 and 65. The sealing rings and bull rings are symmetrical about the center line of the bull ring and hence it is not necessary to describe the other set of sealing rings at the right side of Fig. 9. To maintain the adjacent ends of each series of segments in staggered relation to corresponding ends of the other series of segments, I have provided dowel pins 68 and 69.

From the foregoing disclosure of Figs. 7 to 9, it is seen that I have provided a bull ring adapted to support the weight of the piston or valve and at the same time provide lips on the bull ring adapted to be supported directly on the piston body and to provide interlocking means for the sealing or piston ring segments.

As a result, such construction can be made extremely sturdy and yet readily flexible and otherwise suitably adapted to perform a high degree of sealing action while at the same time insuring that in the event of breakage of any sealing ring the broken parts will be effectively held in position so as to effect at least partial sealing action.

In Fig. 10 it is seen that I have embodied a type of bull ring shown in Fig. 3 in combination with a single series of piston ring segments 70. Each segment is provided with interlocking annular flanges 71 and 72 for engagement with flanges 73 and 74 of the piston head and bull ring respectively. A relatively wide flat spring 75 of circular form is disposed behind the segments 70 to press the same uniformly outward against the wall of the engine cylinder or piston valve cylinder. Preferably two sets of sealing rings are provided one on each side of the bull ring 76.

From all of the foregoing disclosures it is seen that I have provided an extremely simple and yet highly effective combined bull ring and sealing ring arrangement, one that is economical in manufacture and maintenance and is highly effective in operation together with a simplicity that is so essential to a successful packing.

It will of course be understood by those skilled in the art that various changes may be made in the details of construction and arrangement of parts without departing from the spirit of the invention as set forth in the appended claims.

I claim:

1. In combination, a piston having a ring groove formed between two permanent walls and an inwardly projecting flange on one wall thereof, a bull ring mounted on said piston for carrying the weight thereof and having a lip overhanging the other wall of said groove opposite to said first wall, and segmental sealing means disposed in said groove and having oppositely extending flange portions to be guided by said groove walls and adapted for cooperation with said lip and groove flange.

2. In combination, a piston having a ring groove formed between two permanent walls and an inwardly projecting flange on one of said walls, a bull ring mounted on said piston for carrying the weight thereof and having a lip overhanging the other of said walls, segmental sealing means disposed in said groove and having oppositely extending flange portions to be guided by said groove walls and adapted for cooperation with said lip and groove flange, said sealing means being spaced from the bottom of said groove, and spring means disposed in said groove behind said sealing means.

3. In combination, a piston having a ring groove formed between two permanent walls and an inwardly projecting flange on one of said walls, a bull ring mounted on said piston for carrying the weight thereof and having a lip overhanging the other of said walls, segmental sealing means disposed in said groove and having oppositely extending flange portions to be guided by said groove walls and adapted for cooperation with said lip and groove flange, and means for rigidly and removably securing said bull ring to said piston whereby upon removal of said bull ring said sealing means may be removed.

4. In combination, a piston having a groove formed between two permanent walls one of which has a flange extending laterally inwardly of said groove, a bull ring removably secured to said piston and adapted to carry the weight thereof, said ring having a recessed lip overhanging one of said permanent walls and extending into said groove to provide a flange opposed to said other flange, and sealing means disposed in said groove and having shouldered portions adapted for cooperation with said flanges and for guidance by said walls, said recessed lip and shouldered portions of said sealing means being of such relative proportions that upon removal of said bull ring said sealing means may be moved axially to clear one of said groove flanges whereupon said sealing means may be then moved outwardly from the piston.

5. In combination, a piston having an annular centering recess and a sealing ring groove, an annular flange between said recess and groove, a flange formed integrally with said piston and projecting inwardly of said sealing ring groove at one side thereof, a bull ring having a portion seated in said centering recess and a lip portion seated on said annular flange and overhanging the same into said sealing ring groove to provide a flange for the opposite side of said groove, and segmental sealing means disposed in said sealing ring groove and having shouldered portions adapted to be limited by said groove flanges.

6. In combination, a piston having an annular centering recess and a sealing ring groove, an annular flange between said recess and groove, a flange formed integrally with said piston and projecting inwardly of said sealing ring groove at one side thereof, a bull ring having a portion seated in said centering recess and a lip portion seated on said annular flange and overhanging the same into said sealing ring groove to provide a flange for the opposite side of said groove, segmental sealing means disposed in said sealing ring groove and having shouldered portions adapted to be limited by said groove flanges, said sealing means being spaced from the bottom of said groove, and a relatively flat spring disposed behind said sealing means for forcing the same radially outward.

7. In combination, a piston having an annular centering recess and a sealing ring groove, an annular flange between said recess and groove, a flange formed integrally with said piston and projecting inwardly of said sealing ring groove at one side thereof, a bull ring having a portion seated in said centering recess and a lip portion seated on said annular flange and overhanging the same into said sealing ring groove to provide a flange for the opposite side of said groove, and a plurality of series of segmental sealing rings disposed in said sealing ring groove, said segments in each series having shoulders on their outer sides for cooperation with said groove flanges.

8. In combination, a piston having an annular centering recess and a sealing ring groove, an annular flange between said recess and groove, a flange formed integrally with said piston and projecting inwardly of said sealing ring groove at one side thereof, a bull ring having a portion seated in said centering recess and a lip portion seated on said annular flange and overhanging the same into said sealing ring groove to provide a flange for the opposite side of said groove, a plurality of series of segmental sealing rings disposed in said sealing ring groove, said segments in each series having shoulders on their outer sides for cooperation with said groove flanges and said segments also having recesses in their inner periphery to provide a bottom spacing rib and a spring receiving space, and springs disposed in said spaces and adapted to be guided on one side by said ribs.

9. In combination, a piston having a sealing ring groove with offset bottom portions, a bull ring removably secured to said piston for carrying the weight thereof and having a lip overhanging one side of said groove to provide a flange therefor, a flange formed on said piston and projecting into said groove on the opposite side thereof, and a plurality of series of segmental sealing rings disposed in said groove, one of said series being of less depth than the other and the series having the greatest depth being disposed in the offset portion of said groove having the greatest depth thereby to be guided on its opposite sides by said piston, the rings of the other series being guided by a wall of said groove and by said rings of greatest depth.

10. In combination, a piston having a sealing ring groove with offset bottom portions, a bull ring removably secured to said piston for carrying the weight thereof and having a lip overhanging one side of said groove to provide a flange therefor, a flange formed on said piston and projecting into said groove on the opposite side thereof, a plurality of series of segmental sealing rings disposed in said groove, one of said series being of less depth than the other and the series having the greatest depth being disposed in the offset portion of said groove having the greatest depth thereby to be guided on its opposite sides by said piston, and springs disposed behind each of said series of segmental rings to force the same outwardly independently of each other.

11. In combination, a piston having a sealing ring groove formed adjacent a bull ring mounted on said piston for carrying the weight thereof, flanges projecting toward each other so as to overlie the opposite sides of said groove, two rows of segmental sealing rings disposed in said groove, the rings of each row having slidable contact with each other along their adjacent sides and also having flanges on their outer sides for cooperation with said other flanges, the rings of at least one of said rows having a radial rib on their inner periphery to provide an annular recess, and an expander disposed in said annular recess behind one row of rings and a second expander disposed behind the other row of rings whereby each row of rings may have independent radial movement but with mutual guiding action between said rows.

LAWRENCE W. HANCE.